United States Patent
Hu et al.

(10) Patent No.: US 9,252,668 B2
(45) Date of Patent: Feb. 2, 2016

(54) SWITCHING MODE POWER SUPPLY APPARATUS

(71) Applicant: LG Electronics Inc., Seoul (KR)

(72) Inventors: Jinseok Hu, Changwon-Si (KR);
Kyelyong Kang, Changwon-Si (KR);
Shinhyun Park, Changwon-Si (KR);
Gunil Park, Changwon-Si (KR);
Buhwan Ahn, Changwon-Si (KR);
Jaemin Kim, Changwon-Si (KR)

(73) Assignee: LG ELECTRONICS INC., Seoul (KR)

( * ) Notice: Subject to any disclaimer, the term of this patent is extended or adjusted under 35 U.S.C. 154(b) by 490 days.

(21) Appl. No.: 13/691,409

(22) Filed: Nov. 30, 2012

(65) Prior Publication Data
US 2013/0141944 A1  Jun. 6, 2013

(30) Foreign Application Priority Data

Dec. 1, 2011  (KR) .......................... 10-2011-0127814

(51) Int. Cl.
*H02M 3/24* (2006.01)
*H02M 3/335* (2006.01)
*H02M 1/00* (2007.01)

(52) U.S. Cl.
CPC ............ *H02M 3/24* (2013.01); *H02M 3/33523* (2013.01); *H02M 2001/0032* (2013.01); *Y02B 70/1433* (2013.01); *Y02B 70/16* (2013.01)

(58) Field of Classification Search
CPC ................ H02M 3/24; H02M 3/335–3/33553; H02M 2001/0032; H02M 2001/0035
USPC .................................................. 363/20–21.18
See application file for complete search history.

(56) References Cited

U.S. PATENT DOCUMENTS

| | | | |
|---|---|---|---|
| 7,529,105 B1 | 5/2009 | Choi et al. | |
| 7,667,526 B2* | 2/2010 | Chan et al. | 327/427 |
| 8,274,801 B2* | 9/2012 | Shi et al. | 363/21.03 |
| 8,587,964 B2* | 11/2013 | Yang et al. | 363/21.02 |
| 2010/0219802 A1 | 9/2010 | Lin et al. | |
| 2011/0084677 A1 | 4/2011 | Shi et al. | |

* cited by examiner

*Primary Examiner* — Jessica Han
(74) *Attorney, Agent, or Firm* — Birch, Stewart, Kolasch & Birch, LLP (57) ABSTRACT

A switching mode power supply apparatus is provided. The switching mode power supply apparatus may include a switch unit configured to switch an input voltage to a transformer and a controller configured to select an operation mode having a switching frequency according to a size of a load applied to a secondary side of the transformer and control a switching operation of the switch unit. The switching mode power supply apparatus may include a transformer. A refrigerator having the switching mode power supply apparatus is also provided.

17 Claims, 5 Drawing Sheets

| CONDITION | | PWM 1 | QUASI-RES. | PWM 2 | PWM 3 |
|---|---|---|---|---|---|
| STAND-BY | PIN(W) | 2.5 | 2.17 | 2.0 | 2.16 |
| | FSW(KHz) | 69 | 120 | 65 | 65 |
| | BURST | × | ○ | ○ | ○ |
| COMP.ON | PIN(W) | 7.07 | 6.6 | 6.4 | 6.5 |
| | FSW(KHz) | 66 | 118 | 67.6 | 64 |
| | BURST | × | ○ | ○ | × |
| COST | | $0.43 | $0.5 | $0.3X | $0.43 |

SWITCHING MODE POWER SUPPLY APPARATUS

CROSS-REFERENCE TO RELATED APPLICATIONS

Pursuant to 35 U.S.C. §119(a), this application claims the benefit of earlier filing date and right of priority to Korean Application No. 10-2011-0127814 filed on Dec. 1, 2011, the content of which is incorporated by reference herein in its entirety.

BACKGROUND OF THE DISCLOSURE

1. Field of the Disclosure

The present disclosure relates to a switching mode power supply, and more particularly, to a switching mode power supply for switching an input voltage to have an optimum efficiency according to the size of a load.

2. Description of Related Art

In general, a switching mode power supply apparatus is an apparatus for converting an alternating current power source supplied from a commercial power source into a direct current power source to supply power suitable to the capacity used for various home appliances. For example, a refrigerator may use a switching mode power supply apparatus based on a fly-back scheme.

For the most widely used switching operation schemes, the fly-back switching mode power supply apparatus may use a PWM scheme having a fixed switching frequency and a quasi-resonant scheme having a frequency varied based on the size of a load. In particular, the quasi-resonant scheme has a frequency varied by increasing the frequency when the load is low, and reducing the frequency when the load is high.

The existing switching mode power supply apparatus switches a voltage induced to a secondary side of a transformer by selecting either one of the foregoing two schemes, and thus, for example, with a product with a large load change such as a refrigerator, the efficiency of consumption power can be high only for a specific region of the load. In other words, a power circuit may be implemented to drive a switching operation in either one of the PWM and quasi-resonant scheme, thereby having a problem in which high efficiency cannot be attained for the entire load regions.

BRIEF SUMMARY OF THE DISCLOSURE

Accordingly, an object of the present disclosure is to provide a switching mode power supply apparatus implemented to automatically select a switching operation capable of obtaining an optimum power efficiency based on the size of a load in performing the switching operation for inducing a voltage input from the outside to a secondary side of the transformer.

Furthermore, another object of the present disclosure is to provide a switching mode power supply apparatus for providing an optimal frequency for each switching operation mode selected based on the size of a detected load, thereby allowing the user to regulate the frequency based on the load.

A switching mode power supply apparatus according to an embodiment of the present disclosure may include a switch unit configured to switch an input voltage to a transformer and a controller configured to select an operation mode having a switching frequency according to a size of a load applied to a secondary side of the transformer and control a switching operation of the switch unit.

According to an embodiment, the controller may include a variable oscillation module configured to determine an optimal switching frequency for the switching frequency according to the size of the load applied to the secondary side of the transformer, and the controller selects the operation mode from one of a burst mode, a pulse width modulation (PWM) mode, and a quasi-resonant mode according to the optimal switching frequency and the size of the load determined by the variable oscillation module to repeatedly turn on and off a switch provided in the switch unit.

According to an embodiment, the controller may output a control signal for controlling the switching operation of the switch unit in either one of the burst mode or PWM mode when the size of the load is determined as a low load.

According to an embodiment, the controller may select the burst mode when the size of the load is below a preset level. As a result, the controller may select the burst mode and PWM mode in an ascending order according to the size of the low load to output a control signal for controlling the switching operation of the switch unit.

According to an embodiment, the controller may include a load detection module configured to detect a load applied to the secondary side of the transformer according to a feedback signal.

According to an embodiment, the switch unit may be configured to be connected to a primary side of the transformer to switch a voltage induced to the secondary side of the transformer according to a control signal of the controller.

According to an embodiment, the switching power supply apparatus may include rectifier unit configured to rectify a voltage induced to the secondary side of the transformer and a smoothing unit configured to smooth the rectified voltage.

According to an embodiment, the switch unit may include at least one transistor.

In accordance with another aspect of the present disclosure, an embodiment of a switching mode power supply apparatus may include a transformer having a primary side and a secondary side, a capacitor for storing voltage at the primary side of the transformer, a switch unit configured to switch a voltage stored in the capacitor provided at the primary side of the transformer to the secondary side of the transformer, a controller configured to at least detect a size of a load applied to the secondary side of the transformer, and control the switching operation of the switch unit in a burst mode or a PWM mode when the detected size of the load is a low load and to control the switching operation of the switch unit in a quasi-resonant mode when the detected size of the load is above a medium load, and a driving circuit connected to the secondary side of the transformer.

In addition, a switching mode power supply apparatus according to an embodiment of the present disclosure may control the switching operation in a burst mode or PWM mode at a low load, and control the switching operation in a quasi-resonant mode at above a medium load based on the size of a load applied to the secondary side of the transformer, thereby providing an effect of obtaining an optimum efficiency of consumption power for each load.

Moreover, a switching mode power supply apparatus may be provided with a means for determining an optimum frequency for a switching mode operation to be carried out based on the size of the detected load, thereby providing the user's convenience capable of providing a frequency that can obtain an optimum efficiency for each load.

In accordance with yet another embodiment of the disclosure, a refrigerator is provided. The refrigerator includes a transformer having a primary side and a secondary side, a switch unit configured to switch an input voltage to the primary side of the transformer, a switch unit configured to switch an input voltage, a controller configured to select an operation mode having a switching frequency according to the size of a load applied to the secondary side of the transformer and to control the switching operation of the switch unit, and a driving circuit connected to the secondary side of the transformer.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE INVENTION

Figure 1:
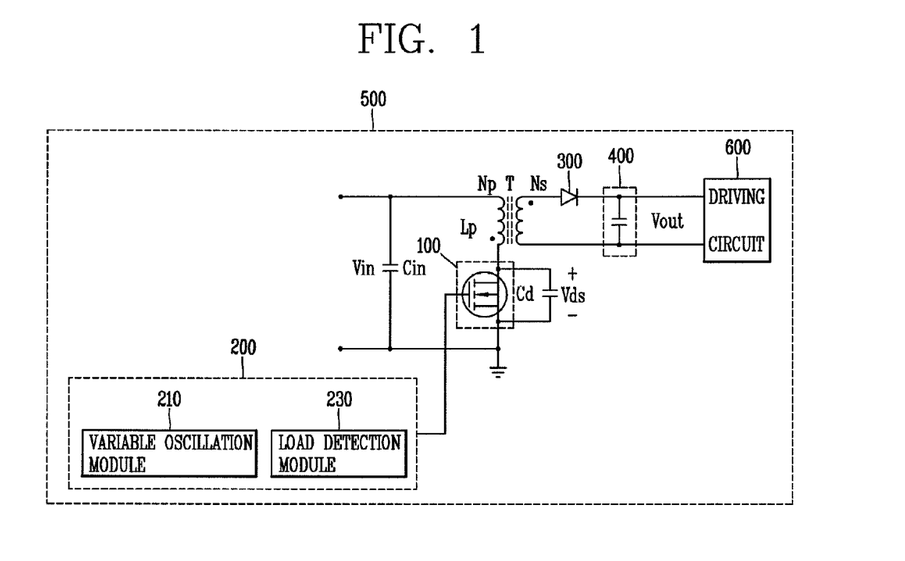
FIG. 1 is a block diagram of a refrigeration having a switching mode power supply apparatus according to an embodiment of the present disclosure.
Figure 2:
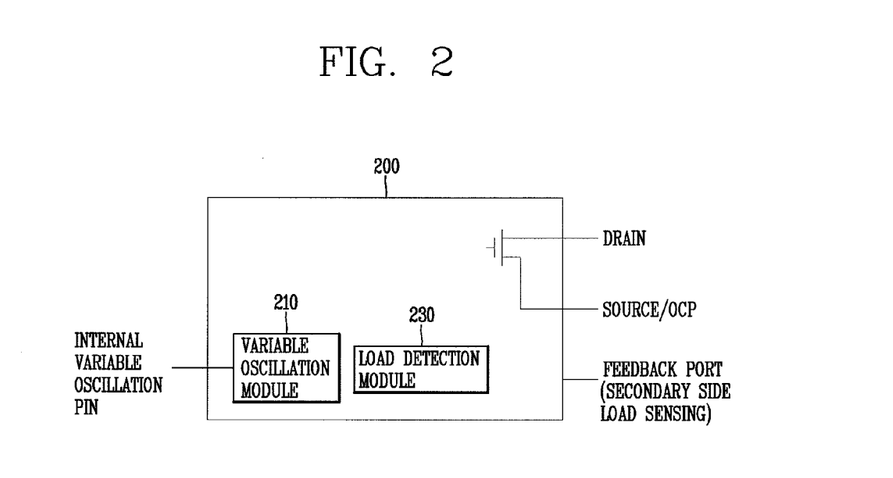
FIG. 2 is a block diagram for a controller of a switching mode power supply apparatus.

Referring to FIGS. 1 and 2, a refrigerator 500 having a switching mode power supply apparatus according to an embodiment of the present disclosure may include a switch unit 100 and a controller 200 configured to control the switching operation of the switch unit 100. The switching mode power supply apparatus may further include a rectifier unit 300 and a smoothing unit 400 for rectifying a switched voltage. The smoothing unit 400 may be connected to a driving circuit 600 for operating one or more elements of the refrigerator 500. In this embodiment, as illustrated in FIG. 1, one end of the switch unit 100 may be connected to the controller 200 and the other end thereof may be connected between a primary side of the transformer T and the ground.

The switch unit 100 switches an input voltage through a switching means provided therein. The switch unit 100 is connected to a primary side of the transformer to operate the switching means provided therein according to a control signal of the controller 200, thereby inducing the input voltage on the primary side of the transformer to the secondary side of the transformer. In this instance, the input voltage input on the switch unit 100 may be a direct current voltage acquired by passing a commercial power source through an EMI filter and rectifier diodes. The transformer T includes a primary side Np and a secondary side Ns, and a winding of the secondary side is electrically coupled with a winding of the primary side, and further includes an auxiliary winding electrically coupled with the winding of the primary side and the winding of the secondary side.

According to an embodiment, the switch unit 100 may be configured with at least one transistor.

The controller 200 selects an operation mode having an optimal switching frequency according to the size of a load applied to the secondary side of the transformer to control the operation of the switch unit 100. In this embodiment, the operation mode may include a burst mode, a pulse width modulation (PWM) mode, and a quasi-resonant mode, and the controller 200 controls the switching operation of the switch unit 100 in any one of those operation modes based on the state of the load. The burst mode corresponds to a switching operation mode for intermittently performing a switching on/off operation when the load applied to the secondary side of the transformer is a low load. The PWM mode performs a switching operation at a fixed switching frequency regardless of the state of the load. The quasi-resonant mode includes a zero-crossing function, and thus performs the switching operation with a variable frequency value for gradually reducing the frequency value when the size of the load is high and increasing the frequency value when the size of the load is low.

The controller 200 may compare the load applied to the secondary side of the transformer with a predetermined reference value to generate an error signal, thereby determining whether or not the state of the load is a low load or medium load. For example, the load may be indicated by a current flowing through the secondary side of the transformer or an output voltage at the secondary side of the transformer. The controller 200 may compare the current flowing through the secondary side with a reference current to determine the state of the load. In this embodiment, the reference current may be set in an arbitrary manner, and for example, may be determined by a combination of passive elements constituting a load detection module which will be described later. It may be different depending on the kind of device, for example, when the device is a refrigerator, the refrigerator may use power energy of 1-2 W when the compressor is not operated, 6-7 W when the compressor is operated, and 30-40 W when a lamp in the refrigerator is turned when the refrigerator door is open. Accordingly, it may also change a current on the secondary side of the transformer.

In this embodiment, both the PWM mode and quasi-resonant mode perform a switching operation in a burst mode at a low load.

The controller 200 may include a variable oscillation module 210 for determining an optimum switching frequency based on the size of the load applied to the secondary side of the transformer. The controller 200 may include a load detection module 230 for detecting a load applied to the secondary side of the transformer based on a feedback signal.

The variable oscillation module 210 is a pin added to the controller 200 of the switching mode power supply apparatus according to an embodiment of the present disclosure, and implemented to select an optimum switching frequency based on the characteristics of an electronic device for which the switching mode power supply apparatus according to an embodiment of the present disclosure is used. In this embodiment, the optimum switching frequency may vary based on the selected switching mode and characteristics of a product. In other words, the switching mode power supply apparatus according to an embodiment of the present disclosure may determine an optimum frequency for a switching operation mode to be carried out based on the size of the load detected by the variable oscillation module 210, and the user may adjust a RC time constant in the variable oscillation module 210 to determine a frequency having the optimum efficiency. Due to this, it may be possible to provide a frequency capable of obtaining an optimum efficiency for each load to correspond to different product characteristics.

The load detection module 230 may detect an output voltage applied to a load on the secondary side of the transformer, and the controller 200 may compare the detected output voltage with a predetermined reference voltage to determine whether the state of the detected load is a low or medium load. Alternatively, the load may be a current flowing through the secondary side of the transformer.

The controller 200 may select an operation mode from one of a burst mode, a PWM mode, and a quasi-resonant mode based on a frequency determined by the variable oscillation module 210 and a size of the load detected by the load detection module 230 to output a control signal for repeatedly turning on and off a switching means provided in the switch unit 100.

Figure 3:
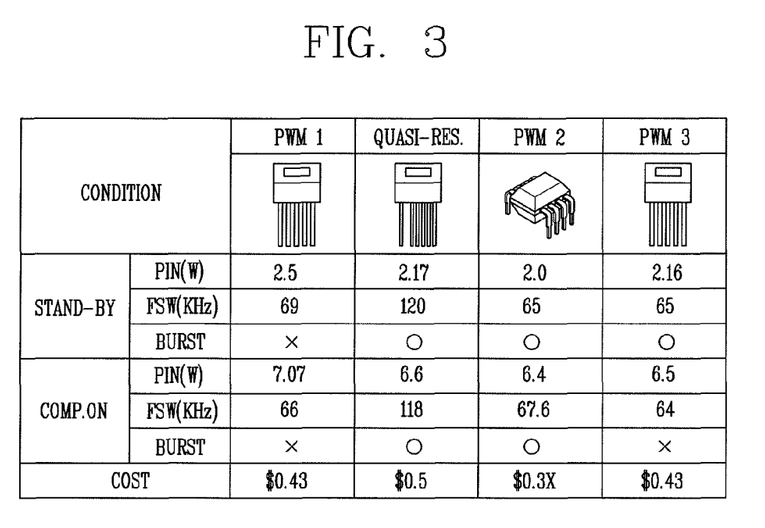
FIG. 3 is a diagram for comparing the efficiencies of a PWM scheme and a quasi-resonant scheme at a low load according to an embodiment of the present disclosure.

The switching mode power supply apparatus according to an embodiment of the present disclosure may perform the switching operation in a burst mode or PWM mode when the size of the load applied to the secondary side of the transformer is a low load, and perform the switching operation in a quasi-resonant mode when determined to be above a medium load, thereby obtaining an optimum efficiency. In this connection, an experiment result is illustrated in FIG. 3 in which power efficiencies between the PWM scheme and quasi-resonant scheme are compared with each other. As illustrated in FIG. 3, when the size of the load is a light load, for example, it is seen that the power efficiency due to a switching operation during the PWM scheme, irrespective of whether the compressor of the refrigerator is in an operation state or standby state, is higher than that of the quasi-resonant scheme.

For example, the controller 200 may detect the size and state of a load applied to the secondary side of the transformer, and when it is a low load, for example, about 15-20% of the maximum load, the transformer may be automatically changed to a standby mode to perform a burst oscillation operation. On the other hand, when the size of the load is above a medium load, it may be more preferable to perform the switching operation in a quasi-resonant mode. In this connection, FIGS. 4A and 4B are graphs for comparing the operations of the PWM scheme and quasi-resonant scheme based on the size of the load, and FIG. 5 is a graph for comparing the changes of frequency based on the size of the load during the operation of the PWM scheme and quasi-resonant scheme.

Figure 4A:
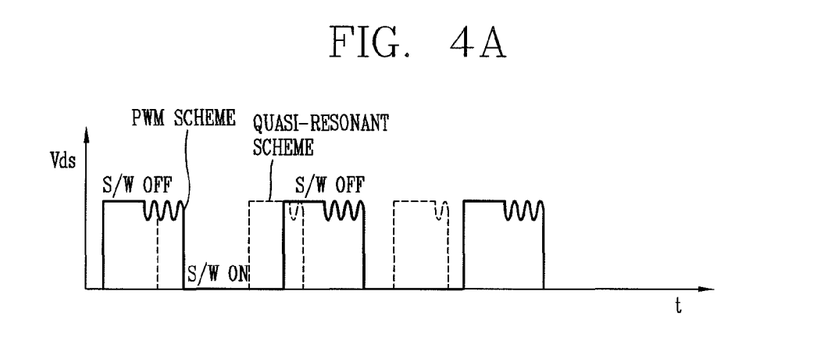
FIGS. 4A and 4B are graphs for comparing the operations of the PWM scheme and quasi-resonant scheme based on the size of a load according to an embodiment of the present disclosure.
Figure 4B:
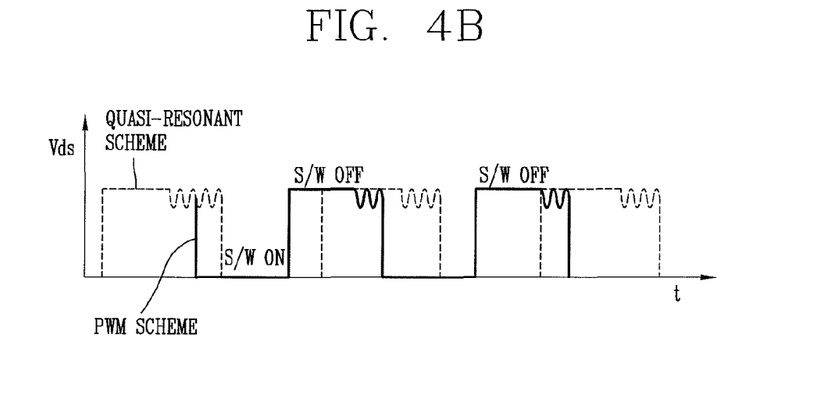

FIG. 4A illustrates burst operations in the PWM and quasi-resonant schemes for performing an intermittent switching operation when a load on the secondary side of the transformer is a low load and FIG. 4B illustrates switching operations compared in the PWM and quasi-resonant schemes when a load on the secondary side of the transformer exceeds the low load. As illustrated in FIGS. 4A and 4B, the turn-on period of switching during the operation of the PWM scheme is longer than that of the quasi-resonant scheme because its frequency is lower than that of the other when the size of the load is a low load (FIG. 4A), and the turn-on period of switching during the operation of the quasi-resonant scheme is longer than that of the PWM scheme because its frequency during the operation of the quasi-resonant scheme sensing zero-crossings is lower than that of the other when the size of the load is above a medium load (FIG. 4B).

Due to this, as seen in FIG. 4A, the PWM scheme performs an intermittent switching operation at a fixed frequency and thus the power efficiency is high at a low load, whereas during the quasi-resonant scheme, the function of sensing zero-crossings is carried out even at a low load, and thus the switching frequency is increased, thereby reducing the power efficiency at a low load compared to that of the PWM scheme. On the other hand, as seen in FIG. 4B, during the PWM scheme, the switching operation is carried out with a similarly fixed frequency and thus the turn-on loss is large during the switching operation, whereas during the quasi-resonant scheme, the turn-on loss is small during the switching operation because it has a function of sensing zero-crossings at above a medium load, thereby increasing the power efficiency. In other words, at a low load, the quasi-resonant scheme with the characteristics of increasing the frequency has a lower efficiency compared to the PWM scheme, whereas at above a medium load, the quasi-resonant scheme has a lower switching frequency compared to the PWM scheme, and thus has a higher efficiency compared to the PWM scheme.

Figure 5:
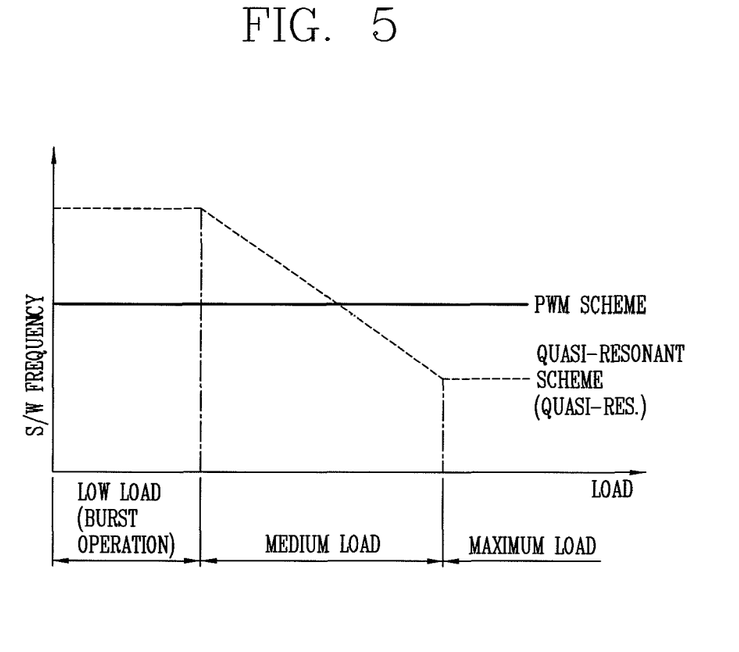
FIG. 5 is a graph for comparing the changes of frequency based on the size of a load during the operation of the PWM scheme and quasi-resonant scheme according to an embodiment of the present disclosure.

FIG. 5 illustrates changes of frequency based on the size of a load during the operation of the PWM scheme and quasi-resonant scheme. As illustrated in FIG. 5, on the basis of a medium load, the PWM scheme has a lower frequency than the quasi-resonant scheme at a low load, and the quasi-resonant scheme performs the switching operation at a lower frequency than the PWM scheme at above the medium load.

Accordingly, when the size of the load is determined as a low load, the controller 200 outputs a control signal for controlling the switching operation of the switch unit 100 in any one operation mode of the burst mode and PWM mode. At this time, the controller 200 selects the burst mode and PWM mode in an ascending order according to the size of the low load to output a control signal for controlling the switching operation of the switch unit 100. For example, it may be operated in the burst mode at less than a predetermined low load threshold value, and the switching operation may be carried out in the PWM mode at above the threshold value and less than the medium load. As described above, it may be possible to determine an optimum frequency corresponding to the selected operation mode by the variable oscillation module 210 provided therein.

When the size of the load is determined to be above the medium load, the controller 200 may output a control signal for controlling the switching operation of the switch unit 100 in the quasi-resonant mode. As described above, it may be possible to determine an optimum frequency corresponding to the quasi-resonant mode by the variable oscillation module 210.

Figure 6:
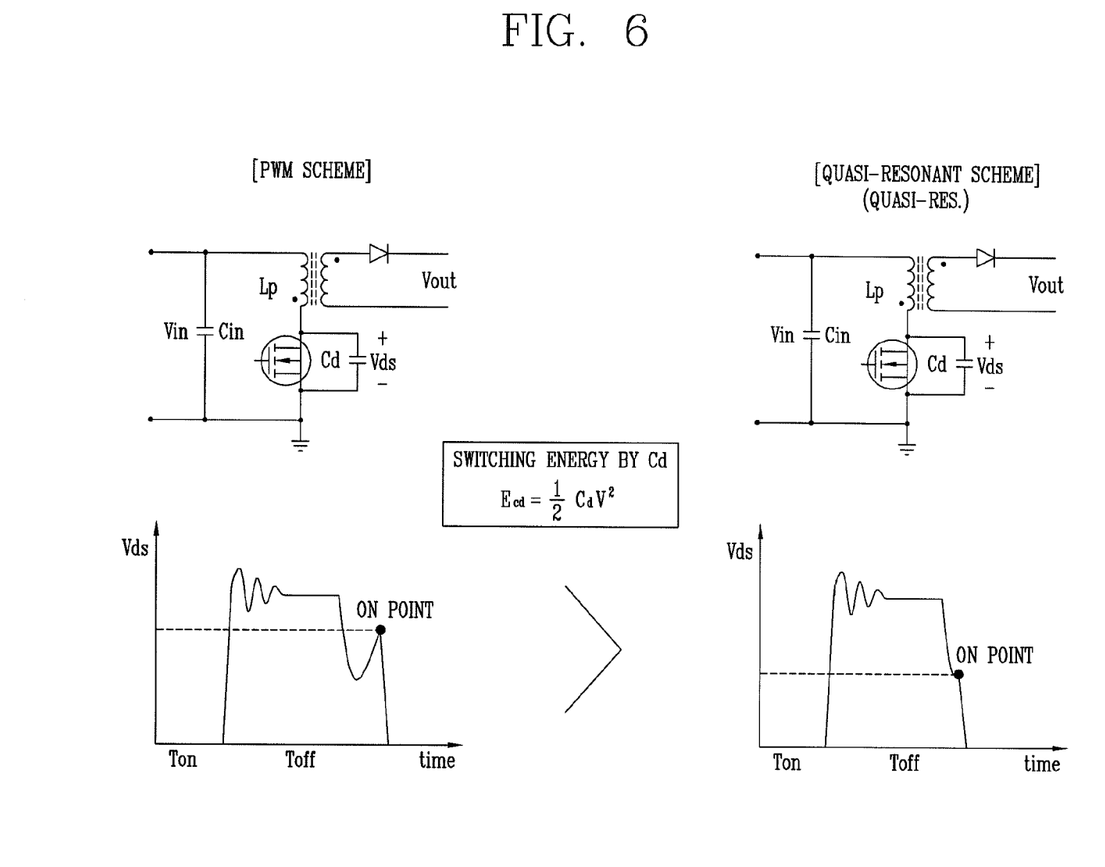
FIG. 6 is a graph for comparing the switching losses due to the characteristics of the operation of the PWM scheme and quasi-resonant scheme according to an embodiment of the present disclosure.

In this connection, FIG. 6 compares switching losses due to the characteristics of the operation of the PWM scheme and quasi-resonant scheme. The switching loss generated in inducing a voltage on the primary side of the transformer to the secondary side of the transformer is expressed as a product of a voltage Vds applied to both ends of the capacitor Cd and a current applied to a switching means of the switch unit 100 as illustrated in FIG. 6. Accordingly, when the voltage Vds applied to both ends of the capacitor Cd is reduced, the loss of switching is also reduced.

Referring to FIG. 6, when the sizes of a voltage Vds applied to both ends of the capacitor Cd are compared with each other with reference to a turn-on point of switching based on the PWM scheme and a turn-on point of switching based on the quasi-resonant scheme, it is seen that the size of the voltage during the quasi-resonant scheme is less than that of the PWM scheme. As a result, it is seen that switching loss during the quasi-resonant scheme is also less than that of the PWM scheme.

Having described the switching unit 100 and the controller 200, the rectifier unit 300 rectifies a voltage induced to the secondary side of the transformer in a switching mode power supply apparatus according to an embodiment of the present disclosure. In this embodiment, the rectifier unit 300 may be implemented as a circuit including at least one diode. For example, the diode provided in the rectifier unit 300 may be implemented in the form of two (two stages of) diodes connected in parallel, or implemented as four (four stages of) diodes in which a pair of diodes connected in series are connected in parallel, respectively. The rectifier unit 300 may include a capacitor connected to the diode of the rectifier unit 300 in parallel to reduce noise generated by the diode of the rectifier unit 300. In addition, the rectifier unit 300 may further include at least one resistor connected to the capacitor in series to stably perform the power operation by improving the fluctuation of a current induced to the secondary side of the transformer.

The smoothing unit 400 smooth the voltage rectified by the rectifier unit 300. In addition, the smoothing unit 400 may store the smoothened and rectified voltage. In this embodiment, the smoothing unit 400, namely, a direct current (DC) link capacitor, may be configured with a capacitor or a simple circuit including the capacitor.

In this manner, a switching mode power supply apparatus according to an embodiment of the present disclosure may include a transformer T having a primary side and a secondary side, and a driving circuit connected to the primary side of the transformer to be driven using an induced input power source. In addition, the switching mode power supply apparatus may include a switch unit 100 configured to output a voltage stored in a capacitor provided in the primary side of the transformer and switch it on the secondary side of the transformer, and may further include a controller 200 configured to detect the size of a load applied to the secondary side of the transformer, and output a control signal for controlling the switching operation of the switch unit in a burst mode or PWM mode when the detected size of the load is a low load or output a control signal for controlling the switching operation of the switch unit in a quasi-resonant mode when the detected size of the load is above a medium load.

Figure 7:
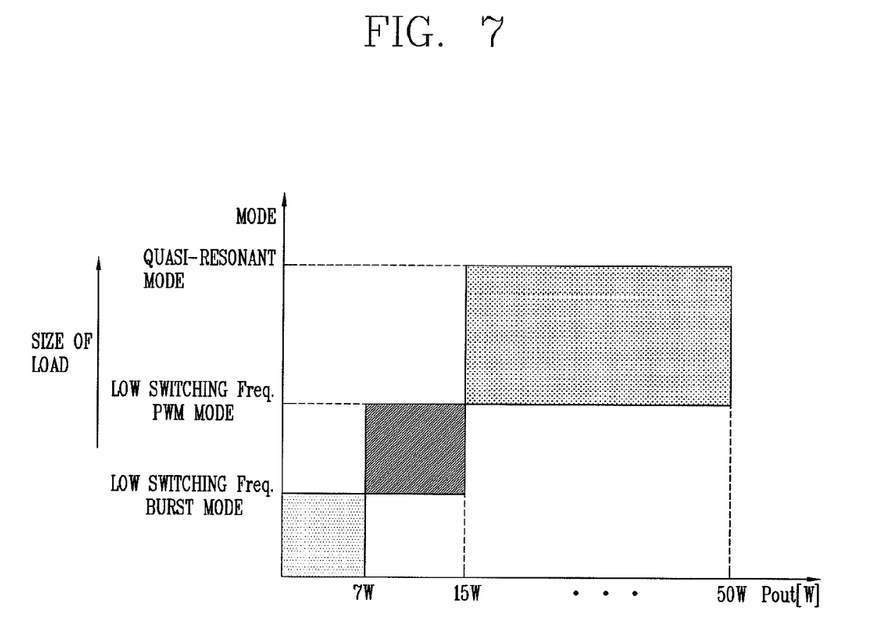
FIG. 7 is a diagram illustrating a switching operation mode capable of obtaining optimum power efficiency for each load according to an embodiment of the present disclosure.

FIG. 7 illustrates a switching operation mode capable of obtaining optimum power efficiency for each load according to an embodiment of the present disclosure. As illustrated in FIG. 7, the switching operation suitable to an optimum switching frequency is carried out in a burst mode in a region with the lowest load, for example, the optimal power value is about 7 W. The switching operation suitable to an optimum switching frequency is carried out in a PWM mode in a region above the lowest load but less than the medium load, for example, the optimal power value is about 15 W. In addition, the switching operation suitable to an optimum switching frequency is carried out in a quasi-resonant mode in a region above the medium load, for example, the optimal power value is about 50 W. In this manner, according to an embodiment of the present disclosure, it may be possible to obtain an optimum efficiency of consumption power for each load.

As described above, in a switching mode power supply apparatus according to an embodiment of the present disclosure, based on the size of a load applied to the secondary side of the transformer, the switching operation may be controlled in a burst mode or PWM mode at a low load, and the switching operation may be controlled in a quasi-resonant mode at above a medium load to obtain an optimum efficiency of consumption power for each load, and furthermore, a means for determining an optimum frequency for a switching mode operation to be carried out based on the size of the detected load may be provided therein to provide user's convenience for providing a frequency having an optimum efficiency for each load.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A switching mode power supply apparatus comprising:
a switch unit configured to switch an input voltage to a transformer; and
a controller configured to select an operation mode having a switching frequency according to a magnitude of a load applied to a secondary side of the transfoiiner and control a switching operation of the switch unit,
wherein the controller includes a load detection module configured to detect a load applied to the secondary side of the transformer according to a feedback signal,
wherein the controller outputs a control signal for controlling the switching operation of the switch unit in either one of a burst mode or a pulse width modulation (PWM) mode according to a magnitude of a low load when the magnitude of the load is determined as the low load, and outputs a control signal for controlling the switching operation of the switch unit in a quasi-resonant mode when the magnitude of the load is determined to be above a medium load, and
wherein the controller outputs a control signal for controlling the switching operation of the switch unit in the burst mode when the magnitude of the load is within a region representing a smallest load, outputs the control signal for controlling the switching operation of the switch unit in the PWM mode when the magnitude of the load is greater than the region representing the smallest load and less than a magnitude of the medium load, and outputs the control signal for controlling the switching operation of the switch unit in the quasi-resonant mode when the magnitude of the load is greater than a magnitude of the medium load.

2. The switching mode power supply apparatus of claim 1, wherein the controller includes a variable oscillation module configured to determine an optimal switching frequency for the switching frequency according to the magnitude of the load applied to the secondary side of the transformer.

3. The switching mode power supply apparatus of claim 2, wherein the controller selects the operation mode from one of the burst mode, the PWM mode, and the quasi-resonant mode according to the optimal switching frequency and the magnitude of the load determined by the variable oscillation module to repeatedly turn on and off a switch provided in the switch unit.

4. The switching mode power supply apparatus of claim 1, wherein the controller outputs a control signal for controlling the switching operation of the switch unit in the burst mode when the magnitude of the load is less than 7 W, outputs the control signal for controlling the switching operation of the switch unit in the PWM mode when the magnitude of the load is greater than 7 W and less than 15 W, and outputs the control signal for controlling the switching operation of the switch unit in the quasi-resonant mode when the magnitude of the load is greater than 15 W.

5. The switching mode power supply apparatus of claim 1, wherein a switching frequency of the switch unit operated with the PWM mode is lower than a switching frequency of the switch unit operated with the quasi-resonant mode when the magnitude of the load is greater than the region representing the smallest load and less than a magnitude of the medium load, and wherein a switching frequency of the switch unit operated with the quasi-resonant mode is lower than a switching frequency of the switch unit operated with the PWM mode when the magnitude of the load is greater than a magnitude of the medium load.

6. The switching mode power supply apparatus of claim 1, wherein the switch unit is configured to be connected to a primary side of the transformer to switch a voltage induced to the secondary side of the transformer according to a control signal of the controller.

7. The switching mode power supply apparatus of claim 1, further comprising:
a rectifier unit configured to rectify a voltage induced to the secondary side of the transformer; and
a smoothing unit configured to smooth the rectified voltage.

8. The switching mode power supply apparatus of claim 1, wherein the switch unit includes at least one transistor.

9. A switching mode power supply apparatus comprising:
a transformer having a primary side and a secondary side;
a capacitor for storing voltage at the primary side of the transformer;
a switch unit configured to switch a voltage stored in the capacitor provided at the primary side of the transformer to the secondary side of the transformer;
a controller configured to at least detect a magnitude of a load applied to the secondary side of the transformer, and control the switching operation of the switch unit in a burst mode or a pulse width modulation (PWM) mode when the detected magnitude of the load is a low load and to control the switching operation of the switch unit in a quasi-resonant mode when the detected size of the load is above a medium load; and
a driving circuit connected to the secondary side of the transformer,
wherein the controller includes a load detection module configured to detect the load applied to the secondary side of the transformer according to a feedback signal,
wherein the controller outputs a control signal for controlling the switching operation of the switch unit in one of the burst mode or PWM mode according to the magnitude of the low load when the magnitude of the load is determined as the low load, and outputs a control signal for controlling the switching operation of the switch unit in the quasi-resonant mode when the magnitude of the load is determined to be above the medium load, and
wherein the controller outputs a control signal for controlling the switching operation of the switch unit in the burst mode when the magnitude of the load is within a region representing a smallest load, outputs the control signal for controlling the switching operation of the switch unit in the PWM mode when the magnitude of the load is greater than the region representing the smallest load and less than a magnitude of the medium load, and outputs the control signal for controlling the switching operation of the switch unit in the quasi-resonant mode when the magnitude of the load is greater than a magnitude of the medium load.

10. The switching mode power supply apparatus of claim 9, wherein the controller outputs a control signal for controlling the switching operation of the switch unit in the burst mode when the magnitude of the load is less than 7 W, outputs the control signal for controlling the switching operation of the switch unit in the PWM mode when the magnitude of the load is greater than 7 W and less than 15 W, and outputs the control signal for controlling the switching operation of the switch unit in the quasi-resonant mode when the magnitude of the load is greater than 15 W.

11. The switching mode power supply apparatus of claim 9, wherein the controller includes a variable oscillation module configured to determine an optimal switching frequency according to the magnitude of the load applied to the secondary side of the transformer, and
wherein the controller selects one of the burst mode, the PWM mode, and the quasi-resonant mode according to the optimal switching frequency and the magnitude of the load determined by the variable oscillation module to repeatedly turn on and off a switching means provided in the switch unit.

12. The switching mode power supply apparatus of claim 11, wherein a switching frequency of the switch unit operated with the PWM mode is lower than a switching frequency of the switch unit operated with the quasi-resonant mode when the magnitude of the load is greater than the region representing the smallest load and less than a magnitude of the medium load, and
wherein a switching frequency of the switch unit operated with the quasi-resonant mode is lower than a switching frequency of the switch unit operated with the PWM mode when the magnitude of the load is greater than a magnitude of the medium load.

13. A refrigerator comprising:
a transformer having a primary side and a secondary side;
a switch unit configured to switch an input voltage to the primary side of the transformer;
a switch unit configured to switch an input voltage; and
a controller configured to select an operation mode having a switching frequency according to the magnitude of a load applied to the secondary side of the transformer and to control the switching operation of the switch unit; and
a driving circuit connected to the secondary side of the transformer,
wherein the controller includes a load detection module configured to detect the load applied to the secondary side of the transformer according to a feedback signal,
wherein the controller outputs a control signal for controlling the switching operation of the switch unit in one of a burst mode or a pulse width modulation (PWM) mode according to a magnitude of a low load when the magnitude of the load is determined as the low load, and outputs a control signal for controlling the switching operation of the switch unit in the quasi-resonant mode when the magnitude of the load is determined to be above a medium load, and
wherein the controller outputs a control signal for controlling the switching operation of the switch unit in the burst mode when the magnitude of the load is within a region representing a smallest load, outputs the control signal for controlling the switching operation of the switch unit in the PWM mode when the magnitude of the load is greater than the region representing the smallest load and less than a magnitude of the medium load, and outputs the control signal for controlling the switching operation of the switch unit in the quasi-resonant mode when the magnitude of the load is greater than a magnitude of the medium load.

14. The refrigerator of claim 13, wherein the controller includes a variable oscillation module configured to determine an optimal switching frequency for the switching frequency according to the magnitude of the load applied to the secondary side of the transformer, and wherein the controller selects the operation mode from one of the burst mode, the pulse width modulation (PWM) mode, and the quasi-resonant mode according to the optimal switching frequency and the magnitude of the load determined by the variable oscillation module to repeatedly turn on and off a switching means provided in the switch unit.

15. The refrigerator of claim 13, wherein the controller outputs a control signal for controlling the switching operation of the switch unit in the burst mode when the magnitude of the load is less than 7 W, outputs the control signal for controlling the switching operation of the switch unit in the PWM mode when the magnitude of the load is greater than 7 W and less than 15 W, and outputs the control signal for controlling the switching operation of the switch unit in the quasi-resonant mode when the magnitude of the load is greater than 15 W.

16. The refrigerator of claim 14, wherein a switching frequency of the switch unit operated with the PWM mode is lower than a switching frequency of the switch unit operated with the quasi-resonant mode when the magnitude of the load is greater than the region representing the smallest load and less than a magnitude of the medium load, and wherein a switching frequency of the switch unit operated with the quasi-resonant mode is lower than a switching frequency of the switch unit operated with the PWM mode when the magnitude of the load is greater than a magnitude of the medium load.

17. The refrigerator of claim 13, wherein the load is a load applied to the secondary side of the transformer according to a change of power based on the operation of the refrigerator.

* * * * *